United States Patent
Lindsay

(10) Patent No.: US 10,062,386 B1
(45) Date of Patent: *Aug. 28, 2018

(54) SIGNALING VOICE-CONTROLLED DEVICES

(71) Applicant: Amazon Technologies, Inc., Seattle, WA (US)

(72) Inventor: Allan Timothy Lindsay, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/717,144

(22) Filed: Sep. 27, 2017

Related U.S. Application Data

(63) Continuation of application No. 13/624,528, filed on Sep. 21, 2012, now Pat. No. 9,805,721.

(51) Int. Cl.
*G10L 15/22* (2006.01)
*G10L 15/30* (2013.01)
(Continued)

(52) U.S. Cl.
CPC ............ *G10L 15/265* (2013.01); *G10L 15/22* (2013.01); *H04M 1/6066* (2013.01)

(58) Field of Classification Search
CPC ...... G10L 15/265; G10L 15/22; G10L 15/187; G10L 17/005; H04M 1/6066; H04W 84/18; H04W 4/02; H04L 29/08108
See application file for complete search history.

(56) References Cited

U.S. PATENT DOCUMENTS 5,774,841 A * 6/1998 Salazar .................. G10L 15/22
704/225
5,790,754 A * 8/1998 Mozer .................... G10L 15/16
704/232
(Continued)

FOREIGN PATENT DOCUMENTS

WO     WO2011088053        7/2011

OTHER PUBLICATIONS

Office Action for U.S. Appl. No. 13/624,528, dated Jan. 2, 2015, Allan Timothy Lindsay, "Signaling Voice-Controlled Devices", 35 pages.

(Continued)

*Primary Examiner* — Anne L Thomas-Homescu
(74) *Attorney, Agent, or Firm* — Lee & Hayes, PLLC

(57) ABSTRACT

Techniques for indicating to a voice-controlled device that a user is going to provide a voice command to the device. In response to receiving such an indication, the device may prepare to process an audio signal based on sound captured by a microphone of the device for the purpose of identifying the voice command from the audio signal. For instance, a user may utilize a signaling device that includes a button that, when actuated, sends a signal that is received by the voice-controlled device. In response to receiving the signal, a microphone of the voice-controlled device may capture sound that is proximate to the voice-controlled device and may create an audio signal based on the sound. The voice-controlled device may then analyze the audio signal for a voice command of the user or may provide the audio signal to a remote service for identifying the command.

20 Claims, 6 Drawing Sheets

(51) Int. Cl.
  *G10L 15/187*  (2013.01)
  *G10L 15/26*   (2006.01)
  *H04M 1/60*    (2006.01)

(56) References Cited

U.S. PATENT DOCUMENTS

| | | | | |
|---|---|---|---|---|
| 6,216,018 | B1* | 4/2001 | Nakanishi | H04M 1/6041 379/454 |
| 6,526,335 | B1* | 2/2003 | Treyz | G01C 21/26 307/10.1 |
| 7,260,538 | B2* | 8/2007 | Calderone | 348/14.05 |
| 7,418,392 | B1* | 8/2008 | Mozer | G10L 15/26 315/307 |
| 7,529,677 | B1* | 5/2009 | Wittenberg | G10L 15/30 704/270 |
| 7,720,683 | B1* | 5/2010 | Vermeulen | G10L 15/22 704/235 |
| 7,774,204 | B2  | 8/2010 | Mozer et al. | |
| 7,937,118 | B2* | 5/2011 | Coutinho | H04R 5/04 455/3.01 |
| 8,825,020 | B2  | 9/2014 | Mozer et al. | |
| 9,418,658 | B1* | 8/2016 | David | H04M 1/64 |
| 2002/0002039 | A1* | 1/2002 | Qureshey | G06F 17/30749 455/344 |
| 2002/0132647 | A1* | 9/2002 | Chia | H04M 9/08 455/570 |
| 2002/0193989 | A1* | 12/2002 | Geilhufe | G10L 15/26 704/208 |
| 2003/0105637 | A1* | 6/2003 | Rodriguez | G06F 17/2735 704/270 |
| 2004/0160571 | A1* | 8/2004 | Jannard | G02C 11/06 351/158 |
| 2004/0267534 | A1* | 12/2004 | Beiermeister | B60R 16/0373 704/275 |
| 2005/0027539 | A1* | 2/2005 | Weber | G08C 17/00 704/275 |
| 2005/0058313 | A1* | 3/2005 | Victorian | H04R 25/554 381/315 |
| 2005/0114141 | A1* | 5/2005 | Grody | G10L 15/30 704/270 |
| 2006/0132382 | A1* | 6/2006 | Jannard | G02C 11/06 345/8 |
| 2006/0239471 | A1* | 10/2006 | Mao | H04R 1/406 381/92 |
| 2007/0055531 | A1* | 3/2007 | Nada | B60R 16/0373 704/275 |
| 2007/0135096 | A1* | 6/2007 | Sampath | H04L 51/38 455/412.1 |
| 2007/0198268 | A1* | 8/2007 | Hennecke | G10L 15/22 704/270 |
| 2007/0201639 | A1* | 8/2007 | Park | G10L 15/30 379/90.01 |
| 2007/0265851 | A1* | 11/2007 | Ben-David | G10L 15/30 704/270.1 |
| 2007/0266077 | A1* | 11/2007 | Wengrovitz | H04M 3/42323 709/203 |
| 2007/0266154 | A1* | 11/2007 | Ohta | G06F 21/316 709/225 |
| 2007/0291956 | A1* | 12/2007 | Loether | H04R 27/00 381/80 |
| 2008/0248797 | A1* | 10/2008 | Freeman | H04M 1/72522 455/425 |
| 2008/0268931 | A1* | 10/2008 | Alderucci | G07F 17/3209 463/11 |
| 2009/0029670 | A1* | 1/2009 | Cho | G01C 21/00 455/344 |
| 2009/0132256 | A1* | 5/2009 | Geldbach | H04W 76/14 704/275 |
| 2009/0204410 | A1* | 8/2009 | Mozer | G10L 15/30 704/275 |
| 2009/0253463 | A1* | 10/2009 | Shin | H04M 1/72583 455/563 |
| 2010/0041447 | A1* | 2/2010 | Graylin | H04M 1/05 455/575.2 |
| 2010/0049510 | A1* | 2/2010 | Zhan | G10L 19/005 704/219 |
| 2010/0063670 | A1* | 3/2010 | Brzezinski | H04L 67/1095 701/31.4 |
| 2010/0333163 | A1* | 12/2010 | Daly | H04N 5/4403 725/133 |
| 2011/0102161 | A1* | 5/2011 | Heubel | G06F 3/016 340/407.2 |
| 2011/0105190 | A1* | 5/2011 | Cha | G06F 17/276 455/566 |
| 2011/0138064 | A1* | 6/2011 | Rieger | G06F 17/30905 709/228 |
| 2011/0143664 | A1* | 6/2011 | Fuccello | H04M 1/72519 455/41.2 |
| 2011/0238191 | A1* | 9/2011 | Kristjansson | G06F 1/1626 700/94 |
| 2011/0301950 | A1* | 12/2011 | Ouchi | G10L 15/28 704/231 |
| 2012/0026279 | A1* | 2/2012 | Kato | H04N 7/15 348/14.08 |
| 2012/0062729 | A1* | 3/2012 | Hart | G06F 1/1626 348/135 |
| 2012/0105740 | A1* | 5/2012 | Jannard | G02C 9/04 348/794 |
| 2012/0146918 | A1* | 6/2012 | Kreiner | H04M 1/7253 345/173 |
| 2012/0166184 | A1* | 6/2012 | Locker | G10L 15/22 704/201 |
| 2012/0173238 | A1* | 7/2012 | Mickelsen | G10L 15/30 704/246 |
| 2012/0206050 | A1* | 8/2012 | Spero | B60Q 1/04 315/152 |
| 2012/0214515 | A1* | 8/2012 | Davis | H04W 4/023 455/456.3 |
| 2012/0223885 | A1* | 9/2012 | Perez | G06F 3/011 345/158 |
| 2012/0295708 | A1* | 11/2012 | Hernandez-Abrego | G06F 3/013 463/36 |
| 2012/0300958 | A1* | 11/2012 | Klemmensen | H04R 25/43 381/81 |
| 2013/0033643 | A1* | 2/2013 | Kim | G06F 3/017 348/563 |
| 2013/0035941 | A1* | 2/2013 | Kim | G06F 3/017 704/275 |
| 2013/0183944 | A1* | 7/2013 | Mozer | H04L 12/282 455/414.1 |
| 2013/0218573 | A1* | 8/2013 | Cheng | G10L 15/22 704/275 |
| 2013/0275871 | A1* | 10/2013 | Helm | G11B 27/105 715/716 |
| 2013/0315038 | A1* | 11/2013 | Ferren | G06K 9/3266 367/197 |
| 2013/0325450 | A1* | 12/2013 | Levien | G10L 21/00 704/201 |
| 2013/0325451 | A1* | 12/2013 | Levien | G10L 21/00 704/201 |
| 2013/0325484 | A1* | 12/2013 | Chakladar | G06F 3/167 704/275 |
| 2013/0332165 | A1* | 12/2013 | Beckley | G10L 17/04 704/246 |
| 2014/0003194 | A1* | 1/2014 | Klose | G01S 11/16 367/127 |
| 2014/0019247 | A1* | 1/2014 | Melanson | H04M 1/72572 705/14.58 |
| 2014/0046664 | A1* | 2/2014 | Sarkar | H04W 12/06 704/246 |
| 2014/0049697 | A1* | 2/2014 | Sung | H04N 5/4403 348/734 |
| 2014/0053212 | A1* | 2/2014 | Shoykher | G06F 3/017 725/59 |
| 2014/0074472 | A1* | 3/2014 | Lin | G08C 17/02 704/246 |

(56) References Cited

U.S. PATENT DOCUMENTS

| | | | |
|---|---|---|---|
| 2014/0119567 A1* | 5/2014 | DeLine | B60R 1/12 |
| | | | 381/86 |
| 2014/0195252 A1* | 7/2014 | Gruber | G10L 15/22 |
| | | | 704/275 |
| 2015/0138333 A1* | 5/2015 | DeVaul | G06F 3/013 |
| | | | 348/78 |
| 2016/0239243 A1* | 8/2016 | Chang | G06F 3/1245 |
| 2017/0140757 A1* | 5/2017 | Penilla | G10L 15/22 |
| 2017/0257470 A1* | 9/2017 | Youn | H04M 1/72583 |
| 2018/0014117 A1* | 1/2018 | Graylin | G10L 15/26 |

OTHER PUBLICATIONS

Final Office Action for U.S. Appl. No. 13/624,528, dated May 4, 2015, Allan Timothy Lindsay, "Signaling Voice-Controlled Devices", 39 pages.

Pinhanez, "The Everywhere Displays Projector: A Device to Create Ubiquitous Graphical Interfaces", IBM Thomas Watson Research Center, Ubicomp 2001, 18 pages.

\* cited by examiner

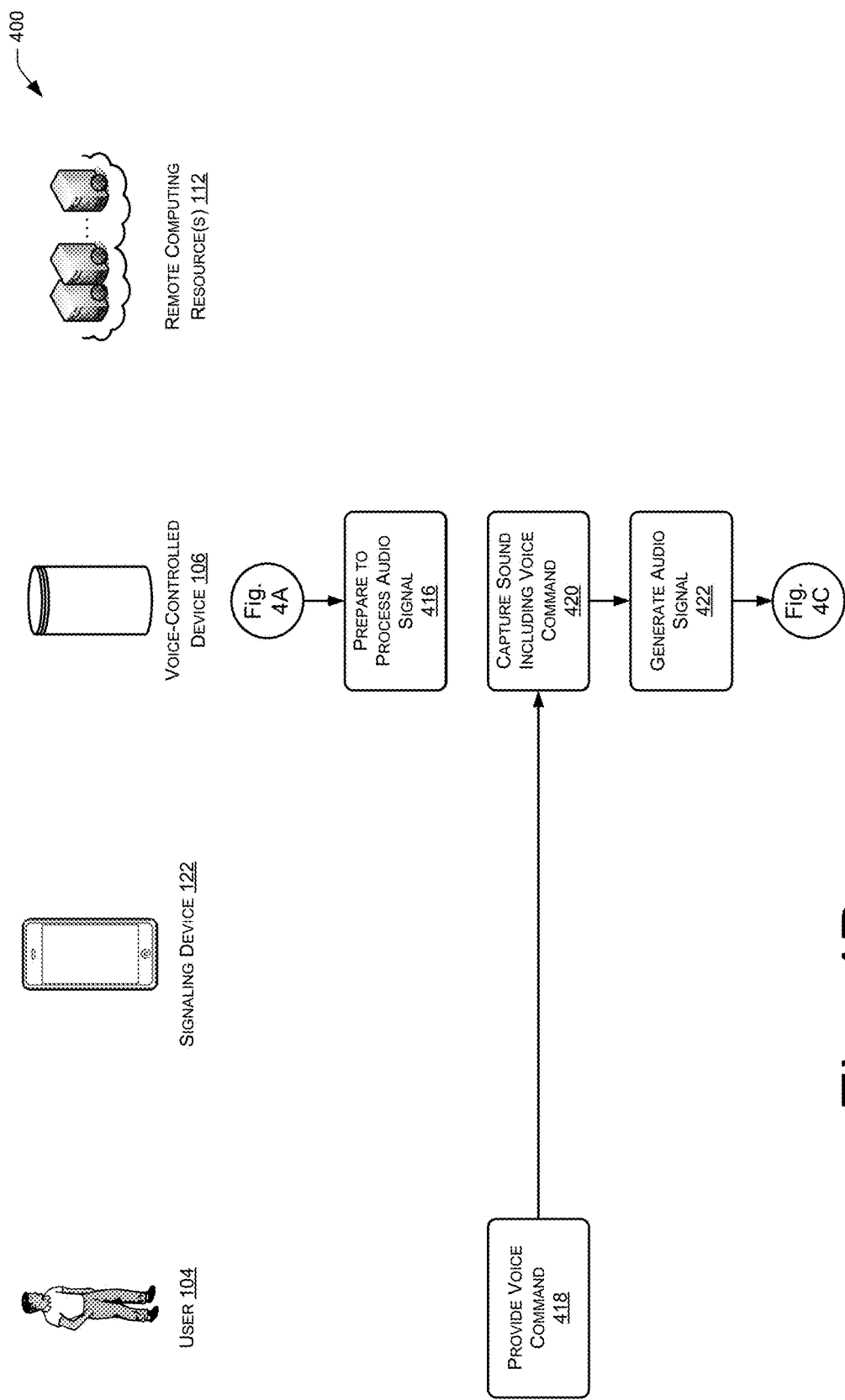

SIGNALING VOICE-CONTROLLED DEVICES

RELATED APPLICATIONS

This application claims priority to and is a continuation of U.S. patent application Ser. No. 13/624,528, filed on Sep. 21, 2012, the entire contents of which are incorporated herein by reference.

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 4A-4C depict a flow diagram of an example process that includes a signaling device sending a signal to a voice-controlled device to indicate to the voice-controlled device that a user is going to provide a voice command.

DETAILED DESCRIPTION

Figure 1:
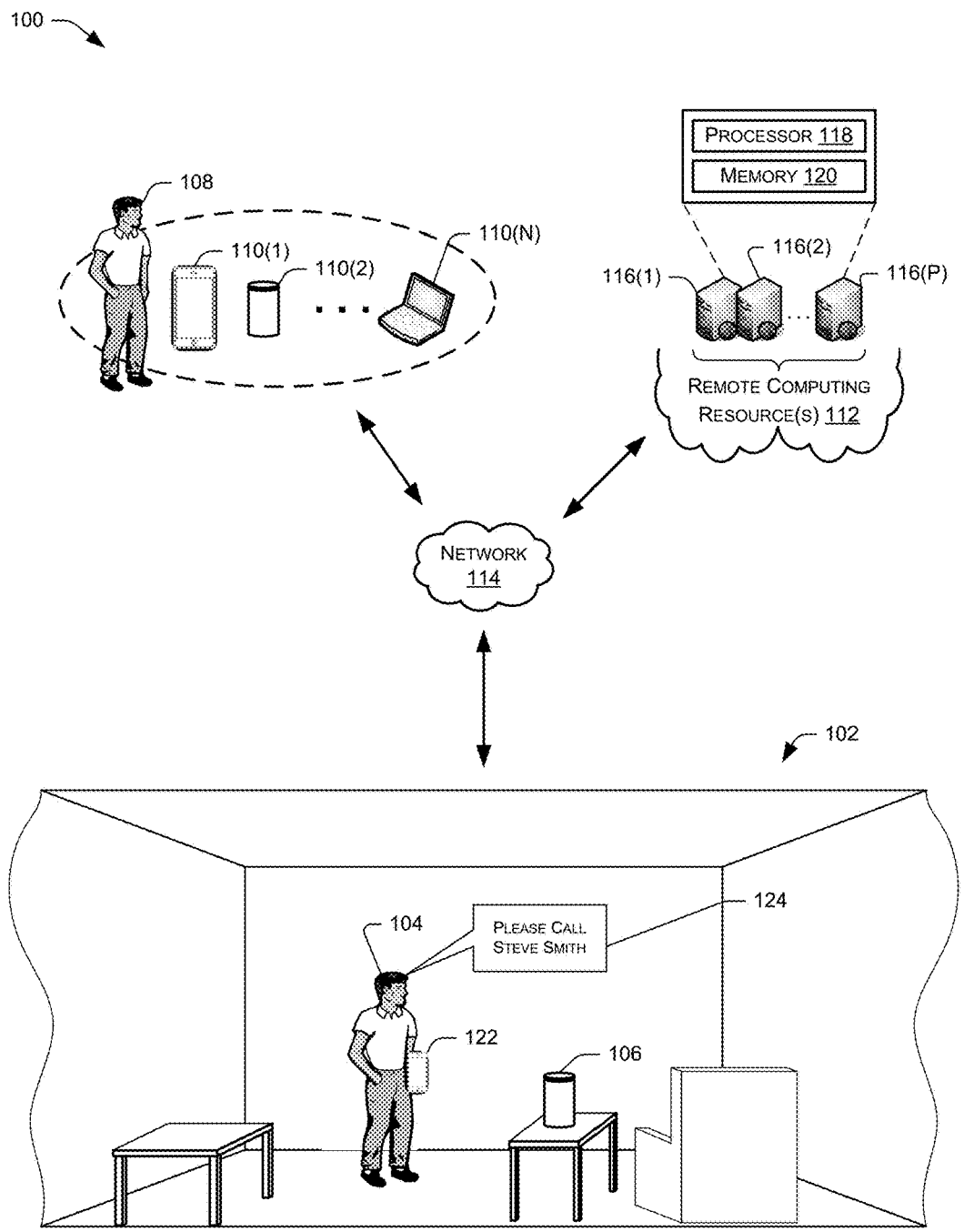
FIG. 1 shows an illustrative voice interaction computing architecture set in a home environment. The architecture includes a voice-controlled device physically situated in the home, along with a user who actuates a button of a signaling device to signal to the voice-controlled device that the user is about to utter a command to the voice-controlled device. In response to receiving the signal from the signaling device, the voice-controlled device prepares to process sound captured by a microphone of the voice-controlled device for the purpose of analyzing an audio signal based on the sound to identify the voice command. The voice-controlled device may alternatively provide the audio signal to a remote service for identifying the voice command.

This disclosure describes, in part, techniques for indicating to a voice-controlled device that a user is going to provide a voice command to the device. In response to receiving such an indication, the device may prepare to process an audio signal based on sound captured by a microphone of the device for the purpose of identifying the voice command from the audio signal. For instance, a user may utilize a signaling device that includes a button that, when actuated, sends a signal that is received by the voice-controlled device. In response to receiving the signal, a microphone of the voice-controlled device may capture sound that is proximate to the voice-controlled device and may create an audio signal based on the sound. The voice-controlled device may then analyze the audio signal for a voice command of the user or may provide the audio signal to a remote service for identifying the command.

After identifying the voice command, or after receiving an indication of the command from the remote service, the voice-controlled device may perform an operation in accordance with the command. For instance, if the user requests that the device play a certain song, the voice-controlled device may begin playing the requested song in response to identifying the command.

In some instances, the user may utilize a signaling device to alert the voice-controlled device that the user is about to provide a voice command to the voice-controlled device. For instance, the signaling device may include an actuatable button that, when actuated, causes the signaling device to send a wireless signal to the voice-controlled device (e.g., over Bluetooth, WiFi, etc.). In response to receiving the signal, the voice-controlled device may prepare to process an audio signal based on a sound subsequently captured by a microphone of the voice-controlled device. The voice-controlled device may then perform an operation corresponding to the voice command.

In addition to preparing to process the audio signal, the voice-controlled device may perform one or more other actions in response to receiving the signal from the signaling device. For instance, if the user is utilizing the voice-controlled device to engage in a voice communication (e.g., a telephone call) with another user operating a remote electronic device (e.g., a mobile phone), the voice-controlled device may effectively mute the communication in response to receiving the signal from the signaling device. That is, in response to receiving the signal from the signaling device, the voice-controlled device may cease providing speech of the user to the other user on the other end of the voice communication. By doing so, the user is able to mute the voice communication without the user at the other end hearing the request. In some instances, the user may effectively "un-mute" the call by again actuating the button. In addition or in the alternative, the voice-controlled device may end the communication altogether (e.g., may hang up the phone call) in response to receiving a particular signal or pattern or signals from the signaling device. For instance, if the user actuates the button twice within a threshold amount of time (e.g., if the user "double clicks" the button), the voice-controlled device may end the voice communication.

In another example, in response to receiving the signal from the signaling device the voice-controlled device may attenuate or cease output of any audio being output by the voice-controlled device. By doing so, the microphone of the voice-controlled device captures less sound from its own speakers and, hence, the voice-controlled device or the remote service is able to more easily perform speech recognition on the audio signal generated by the microphone of the voice-controlled device. In addition, the user providing the voice command need not yell to ensure that the voice-controlled device understands the command of the user.

In some instances the user may first actuate the button on the signaling device to instruct the voice-controlled device that the user is going to provide the command and may again actuate the button to indicate that the user has finished providing the command. In other instances, the user might only actuate the button the first time, with the voice-controlled device identifying the voice command thereafter and performing the appropriate operation.

In addition or in the alternative, the voice-controlled device may utilize the signal from the signaling device to identify a location of the signaling device within the environment or a direction towards the signaling device within the environment. The voice-controlled device may identify this location and/or direction via any suitable method, such as via time-difference-of arrival (TDOA) techniques in instances when the signal includes an audible or inaudible sound. After identifying the location of the signaling device (and presumably the location of the user that actuated the button on the signaling device), the voice-controlled device might use this information when attempting to identify a voice command from the user. For instance, the voice-controlled device may utilize beam-forming techniques to form a beam in the direction of the user to effectively focus on sound originating from that direction.

In still other instances, the voice-controlled device may utilize the signal from the signaling device for authentication purposes. For instance, the voice-controlled device may refrain from performing particular operations (e.g., buying items on behalf of the user) unless the voice-controlled device receives the signal from the signaling device. By doing so, the voice-controlled device helps ensure that only a user having physical access to the signaling device is able to cause the voice-controlled device to purchase items from the respective user.

While a few non-limiting examples are described above and below, the devices and techniques described herein may apply for an array of other purposes. Furthermore, the devices and techniques described above may be implemented in a variety of different architectures and contexts. One non-limiting and illustrative implementation is described below.

Illustrative Environment

FIG. 1 shows an illustrative voice interaction computing architecture 100 set in a home environment 102 that includes a user 104. The architecture 100 also includes an electronic voice-controlled device 106 with which the user 104 may interact. In the illustrated implementation, the voice-controlled device 106 is positioned on a table within a room the home environment 102. In other implementations, it may be placed in any number of locations (e.g., ceiling, wall, in a lamp, beneath a table, under a chair, etc.). Further, more than one device 106 may be positioned in a single room, or one device may be used to accommodate user interactions from more than one room.

Generally, the voice-controlled device 106 has at least one microphone and at least one speaker to facilitate audio interactions with the user 104 and/or other users. In some instances, the voice-controlled device 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic device 106 may be through voice input and audible output. One example implementation of the voice-controlled device 106 is provided below in more detail with reference to FIG. 2.

The microphone of the voice-controlled device 106 detects audio from the environment 102, such as sounds uttered from the user 104. As described in further detail below, the voice-controlled device 106 includes a processor and memory, which may store or otherwise has access to a speech-recognition engine. As used herein, a processor may include multiple processors and/or a processor having multiple cores. The speech-recognition engine performs speech recognition on audio captured by the microphone, such as utterances spoken by the user 104. The voice-controlled device 106 may perform certain actions in response to recognizing different speech from the user 104. The user may speak predefined commands (e.g., "Awake"; "Sleep"), or may use a more casual conversation style when interacting with the device 106 (e.g., "I'd like to go to a movie. Please tell me what's playing at the local cinema.").

The user 104 may also utilize the voice-controlled device 106 for outputting audio (e.g., playing music) via the speaker of the device 106 or via one or more speakers within the environment 102 that the device 106 controls. The user 104 may also utilize the voice-controlled device 106 for engaging in voice communications (e.g., "telephone calls") with users that are remote from the environment 102. For instance, in the illustrated example the user 104 may utilize the voice-controlled device 106 for communicating with another user 108, who may utilize another electronic device for communicating with the user 104. For instance, the user 108 may utilize a mobile phone 110(1), another voice-controlled device 110(2), a laptop computer 110(N), and/or any other type of electronic device.

In some instances, the voice-controlled device 106 may operate in conjunction with or may otherwise utilize computing resources 112 that are remote from the environment 102. For instance, the voice-controlled device 106 may couple to the remote computing resources 112 over a network 114. As illustrated, the remote computing resources 112 may be implemented as one or more servers 116(1), 116(2), . . . , 116(P) and may, in some instances form a portion of a network-accessible computing platform implemented as a computing infrastructure of processors, storage, software, data access, and so forth that is maintained and accessible via a network such as the Internet. The remote computing resources 112 do not require end-user knowledge of the physical location and configuration of the system that delivers the services. Common expressions associated for these remote computing devices 112 include "on-demand computing", "software as a service (SaaS)", "platform computing", "network-accessible platform", "cloud services", "data centers", and so forth.

The servers 116(1)-(P) include a processor 118 and memory 120, which may store or otherwise have access to some or all of the components described with reference to the memory of the voice-controlled device 106 in FIG. 2. For instance, the memory 120 may have access to and utilize the speech-recognition engine for receiving audio signals from the device 106, recognizing speech and, potentially, causing performance of an action in response. In some examples, the voice-controlled device 106 may upload audio data to the remote computing resources 112 for processing, given that the remote computing resources 112 may have a computational capacity that far exceeds the computational capacity of the voice-controlled device 106. Therefore, the voice-controlled device 106 may utilize the speech-recognition engine at the remote computing resources 112 for performing relatively complex analysis on audio captured from the environment 102.

Regardless of whether the speech recognition occurs locally or remotely from the environment 102, the voice-controlled device 106 may receive vocal input from the user 104 and the device 106 and/or the resources 112 may perform speech recognition to interpret a user's operational request or command. The requests may be for essentially type of operation, such as database inquires, requesting and consuming entertainment (e.g., gaming, finding and playing music, movies or other content, etc.), personal management (e.g., calendaring, note taking, etc.), online shopping, financial transactions, and so forth.

The voice-controlled device 106 may communicatively couple to the network 114 via wired technologies (e.g., wires, USB, fiber optic cable, etc.), wireless technologies (e.g., RF, cellular, satellite, Bluetooth, etc.), or other connection technologies. The network 114 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

In some instances, the user 104 may utilize a signaling device 122 to signal to the voice-controlled device 106 that the user 104 is about to provide a voice command to the voice-controlled device 106. For instance, the signaling device 122 may include a device that includes a physical button or a soft button (e.g., rendered on a graphical user interface (GUI)) that the user 104 may actuate prior to uttering a voice command. The voice-controlled device 106 may receive the signal from the signaling device wirelessly (e.g., via Bluetooth, WiFi, etc.) and may begin preparing to process sound captured by a microphone in response.

For instance, if the voice-controlled device 106 is playing music when the device receives the signal, the voice-controlled device 106 may attenuate or cease the playing of the music in response to receiving the signal. By doing so, the audio signal generated by the microphone of the device 106 has a greater signal-to-noise ratio and, therefore, the device 106 or the resources 112 are able to more easily perform speech recognition on the audio signal.

In instances where the user 104 is engaging in a voice communication with the other user 108, the voice-controlled device 106 may cease providing speech of the user 104 over the network 114 to the remote device 110(1)-(N). That is, the voice-controlled device 106 may effectively "mute" the telephone call such that the other user 108 is unable to hear a voice command that the user 104 is about to provide to the voice-controlled device 106.

In either instance, in response to receiving the signal from the signaling device 122, the voice-controlled device 106 may identify a location of the device 122 and, hence, the user 104 about to provide the voice command. After identifying the location or direction of the user 104, the voice-controlled device 106 may then utilize beam-forming techniques to focus on sound captured from an area of the environment 102 in which the user 104 is positioned.

As illustrated, after actuating a button on the signaling device 122 (and hence signaling to the voice-controlled device 106 that the user 104 is about to provide a voice command), the user 104 provides a voice command requesting that the voice-controlled device 106 "call Steve Smith". The microphone of the voice-controlled device 106 may capture sound that includes this voice command and may generate an audio signal based on this sound. The voice-controlled device 106 may then either analyze the audio signal to identify the voice command and/or may provide the audio signal to the remote computing resources 112 for analyzing the audio signal. In the latter instances, the voice-controlled device 106 may receive an indication of the voice command from the remote computing resources 112.

After identifying the voice command or receiving an indication of the voice command, the voice-controlled device 106 may perform an operation associated with the command. For instance, in this illustrated example the voice-controlled device 106 may place a telephone call of behalf of the user 104 to the fictional user Steve Smith.

In some instances, the user 104 may actuate the button on the signaling device 122 a first time to signal to the voice-controlled device 106 that the user 104 is about to provide a command and, after uttering the command, may again actuate the button to signal to the voice-controlled device 106 that the user 104 has completed the command. In other instances, meanwhile, the voice-controlled device 106 may instead identify the end of the user's command based on the absence of speech (at the end of the command) within the audio signal generated by the microphone.

While the user 104 may utilize the signaling device 122 as described above, the signaling device 122 may be used for other purposes in some instances. For instance, the user 104 may actuate a button on the signaling device 122 to end a voice communication with another user (e.g., to hang up the call). For instance, the voice-controlled device 106 may interpret a double-click actuation as a request to hang up the phone call. In another example, the voice-controlled device 106 may provide audible calendar reminders to the user (e.g., "Remember to pick up Grace from school in fifteen minutes"). In these instances, the user 104 may dismiss the reminder by actuating a button on the signaling device 122. Of course, while a few examples have been provided, it is to be appreciated that the signaling device 122 may be used for an array of other purposes.

Illustrative Voice-Controlled Device

Figure 2:
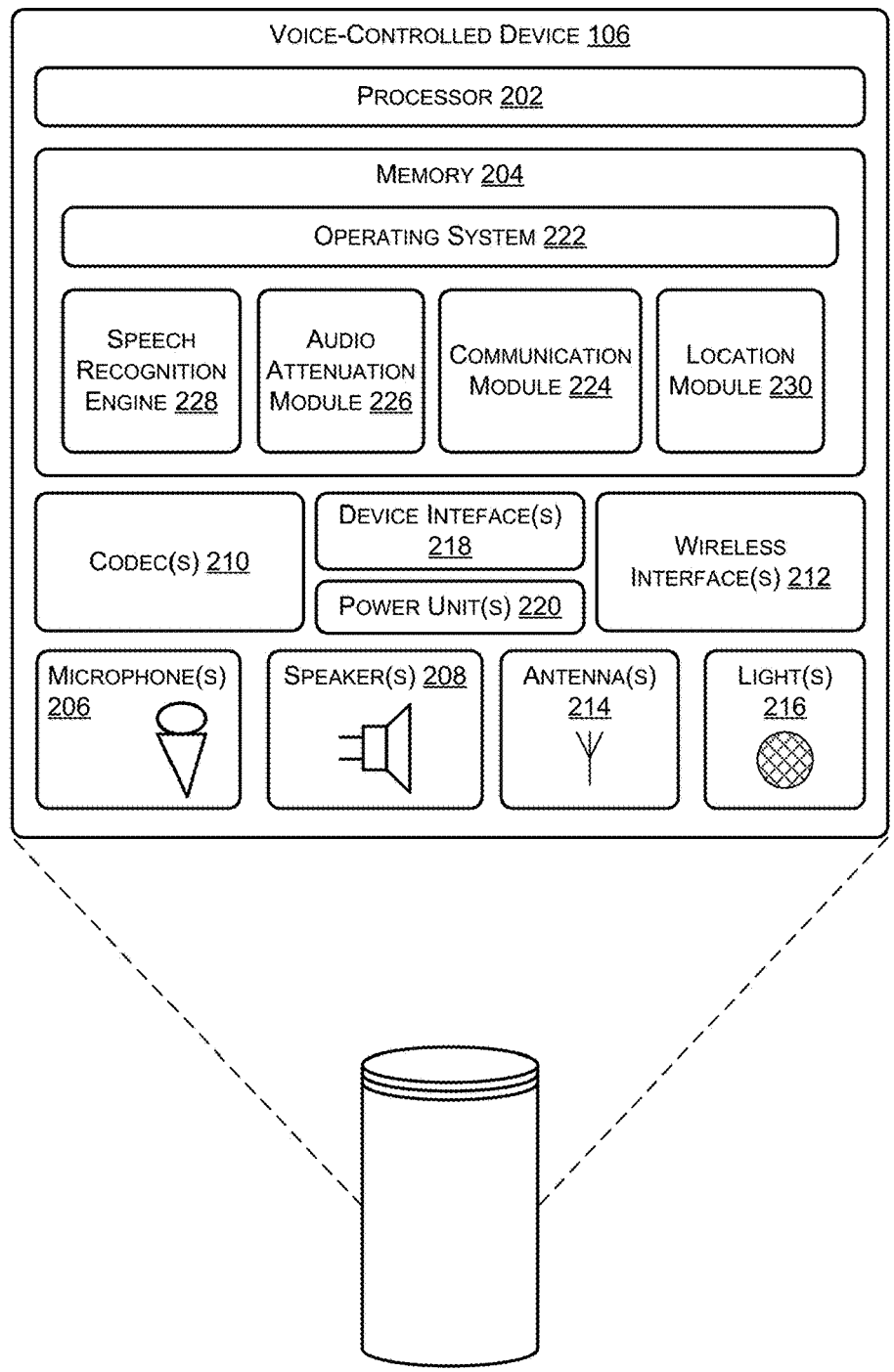
FIG. 2 shows a block diagram of selected functional components implemented in the voice-controlled device of FIG. 1.

FIG. 2 shows selected functional components of the voice-controlled device 106 in more detail. Generally, the voice-controlled device 106 may be implemented as a standalone device that is relatively simple in terms of functional capabilities with limited input/output components, memory and processing capabilities. For instance, the voice-controlled device 106 does not have a keyboard, keypad, or other form of mechanical input in some implementations, nor does it have a display or touch screen to facilitate visual presentation and user touch input. Instead, the device 106 may be implemented with the ability to receive and output audio, a network interface (wireless or wire-based), power, and limited processing/memory capabilities.

In the illustrated implementation, the voice-controlled device 106 includes a processor 202 and memory 204. The memory 204 may include computer-readable storage media ("CRSM"), which may be any available physical media accessible by the processor 202 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 202.

The voice-controlled device 106 includes one or more microphones 206 to receive audio input, such as user voice input, and one or more speakers 208 to output audio sounds. A codec 210 is coupled to the microphone 206 and speaker 208 to encode and/or decode the audio signals. The codec may convert audio data between analog and digital formats. A user may interact with the device 106 by speaking to it, and the microphone 206 captures the user speech. The codec 210 encodes the user speech and transfers that audio data to other components. The device 106 can communicate back to the user by emitting audible statements through the speaker 208. In this manner, the user interacts with the voice-controlled device simply through speech, without use of a keyboard or display common to other types of devices.

In the illustrated example, the voice-controlled device 106 includes a wireless interface 212 coupled to an antenna 214 to facilitate a wireless connection to a network. The wireless interface 212 may implement one or more of various wireless technologies, such as WiFi, Bluetooth, RF, and so on. The voice-controlled device 106 may also include one or more lights 216, which in some instances are arranged around a top of the cylindrical housing of the device 106. The device 106 may illuminate the lights in a particular pattern based on voice commands received from the user 104 to indicate to the user 104 that the device 106 has received the user's particular command.

One or more device interfaces 218 (e.g., USB, broadband connection, etc.) may further be provided as part of the device 106 to facilitate a wired connection to a network, or a plug-in network device that communicates with other wireless networks. A power unit 220 is further provided to distribute power to the various components on the device 106.

The voice-controlled device 106 is designed to support audio interactions with the user, in the form of receiving voice commands (e.g., words, phrase, sentences, etc.) from the user and outputting audible feedback to the user. Accordingly, in the illustrated implementation, there are no haptic input devices, such as navigation buttons, keypads, joysticks, keyboards, touch screens, and the like. Further there is no display for text or graphical output. In one implementation, the voice-controlled device 106 may include non-input control mechanisms, such as basic volume control button(s) for increasing/decreasing volume, as well as power and reset buttons. There may also be an additional simple light element (e.g., LED) to indicate a state such as, for example, when power is on. But, other than the described lights, the device 106 might not use or need to use any input devices or displays in some instances.

Several modules such as instruction, datastores, and so forth may be stored within the memory 204 and configured to execute on the processor 202. An operating system module 222 is configured to manage hardware and services (e.g., wireless unit, USB, Codec) within and coupled to the device 106 for the benefit of other modules.

In addition, the memory 204 may include a communication module 224, an audio attenuation module 226, a speech recognition engine 228, and a location module 230. The communication module 224 may receive a signal from the signaling device 122 described above with reference to FIG. 1. In some instances, the module 224 receives this signal via the wireless interface 212. In response to receiving the signal, the communication module 224 may inform the audio attenuation module 226 of the signal, which in turn may attenuate or cease any audio being output by the speaker 208. If the device is currently maintaining a voice communication with another device (e.g., a telephone call), the communication module 224 may effectively mute the call.

After receiving the signal, the communication module 224 may also provide this indication to the speech recognition engine 228, which may attempt to identify a voice command from within an audio signal generated by the microphone 206. Alternatively, the communication module 224 may provide the audio signal to a remote service (e.g., the remote computing resources 112) for analyzing the audio signal to identify a voice command of the user. That is, in response to receiving the signal from the signaling device, the communication module 224 may begin streaming captured audio to the remote resources 112 for analysis.

The memory 204 may also store the location module 230, which may identify a location or direction of the signaling device that provided the signal to the device 106. With this information, the device 106 may focus its attention towards sound originating from this location or direction. For instance, the device 106 may form a beam directed towards this location or direction.

While the foregoing modules are described as residing on the device, some or all of these modules and components may reside additionally or alternatively at the remote computing resources 112.

Illustrative Signaling Devices

Figure 3A:
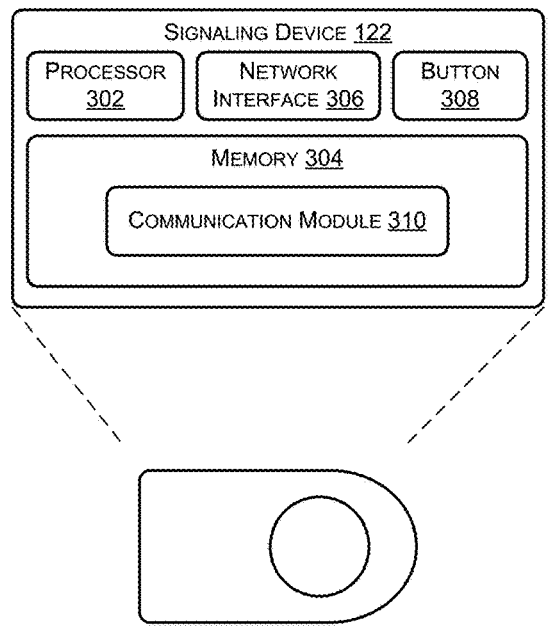
FIGS. 3A and 3B each illustrate a respective block diagram for selected functional components in the signaling device of FIG. 1.
Figure 3B:
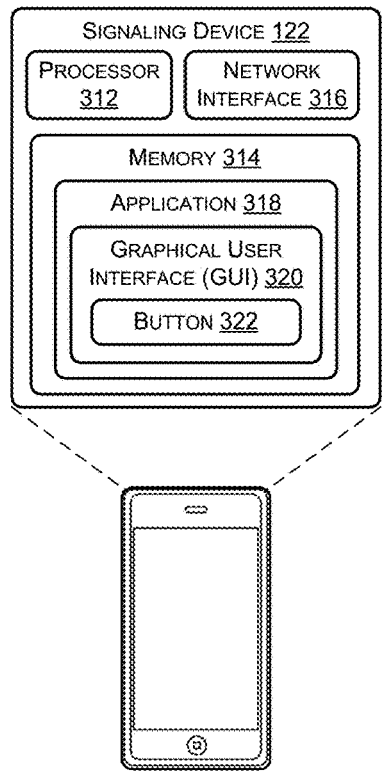

FIGS. 3A and 3B each illustrate a respective block diagram for selected functional components in the signaling device of FIG. 1. In FIG. 3A, the signaling device is a dedicated signaling device in the form a "key fob". That is, in this example the signaling device 122 is a simple device that, in some implementations, includes a single, physical, actuatable button within a housing of the device for interacting with the voice-controlled device 106. For instance, this key fob may comprise a simple remote control that is configured to attach to a key ring or the like. Conversely, the key fob may be a standalone device, similar to a garage door opener that easily fits in a shirt or pants pocket, within a purse or bag, or the like. In still other implementations, the key fob may be a small, clip-on device (e.g., configured to clip on to a user's belt, to a strap of a bag, or the like). Of course, in other instances the signaling device may include multiple buttons and potentially other features.

In the illustrated example, the signaling device 122 of FIG. 3A include a processor 302 and memory 304. The memory 304, like each memory described herein, may include computer-readable storage media ("CRSM"), which may be any available physical media accessible by the processor 302 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 302.

In addition, the signaling device 122 includes a network interface 306, a button 308, and a communication module 310 stored in the memory 304. In response to a user actuating the button 308, the communication module 310 may generate and send a signal via the network interface 306. As described above, a user may actuate this button 308 to indicate to the voice-controlled device 106 that the user is about to provide a voice command to the device 106.

FIG. 3B, meanwhile, illustrates an example where the signaling device 122 is implemented as part of a multifunctional device, such as a smart phone or the like. In this example, the signaling device 122 may include a processor 312, memory 314, and a network interface 316. The memory may store an application that renders a graphical user interface (GUI) 320 that includes a soft button 322. When the user actuates the soft button to send a signal to the voice-controlled device 106, the application 318 may generate and send the signal to the device via the network interface 316. Again, the signal is effective to indicate to the voice-controlled device that the user is about to provide a voice command.

As discussed above, the soft button 322 may comprise a button represented on the GUI 320. In some instances, the device may include a touch screen or may couple to a mouse, a keyboard, or another input mechanism that enables a user to select the soft button 322. Therefore, a user of the signaling device 122 may select the soft button 322 via selection of the soft button on the touch screen, via selection of the soft button using the mouse, or the like.

Illustrative Process

Figure 4A:
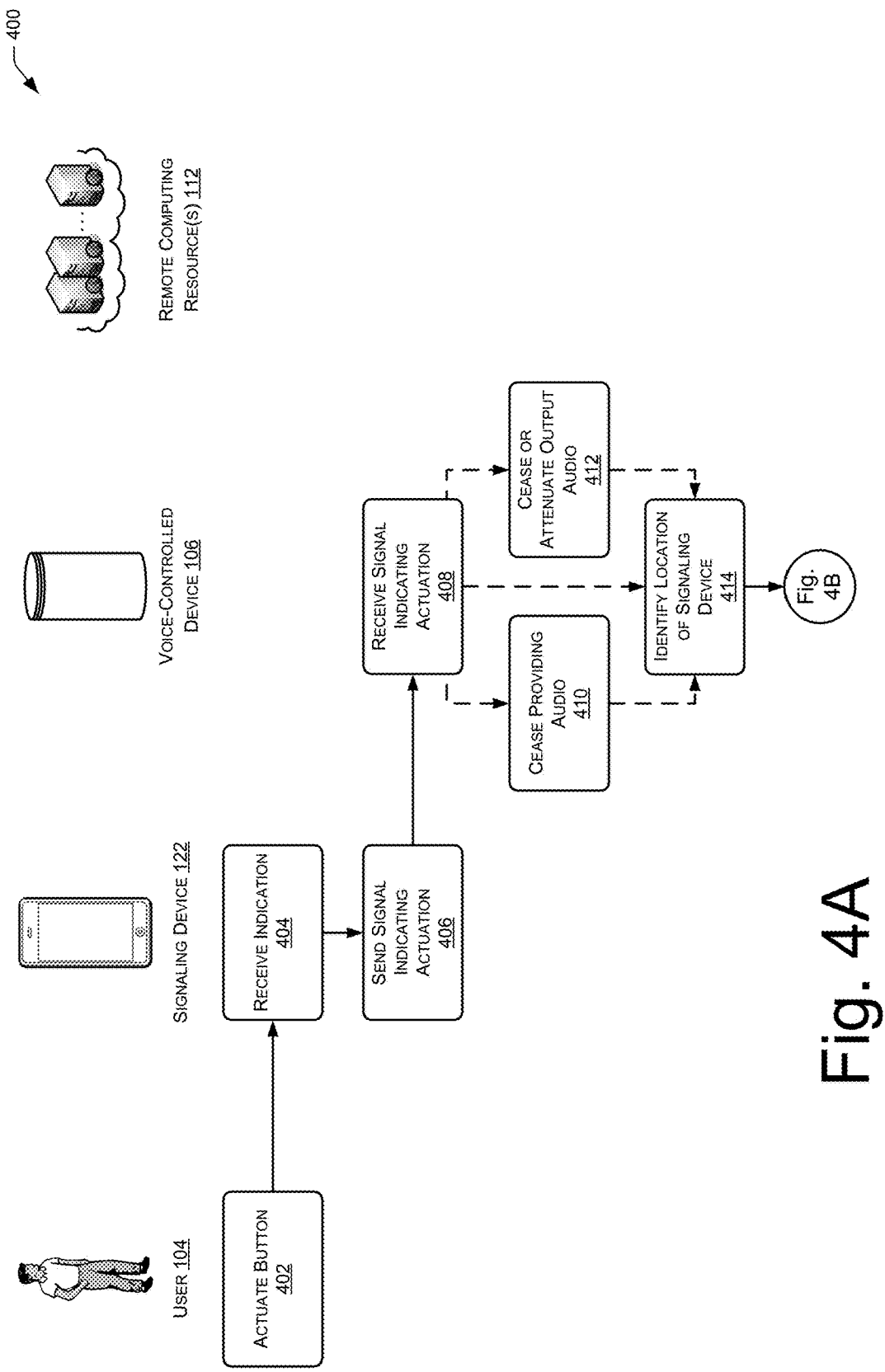
Figure 4C:
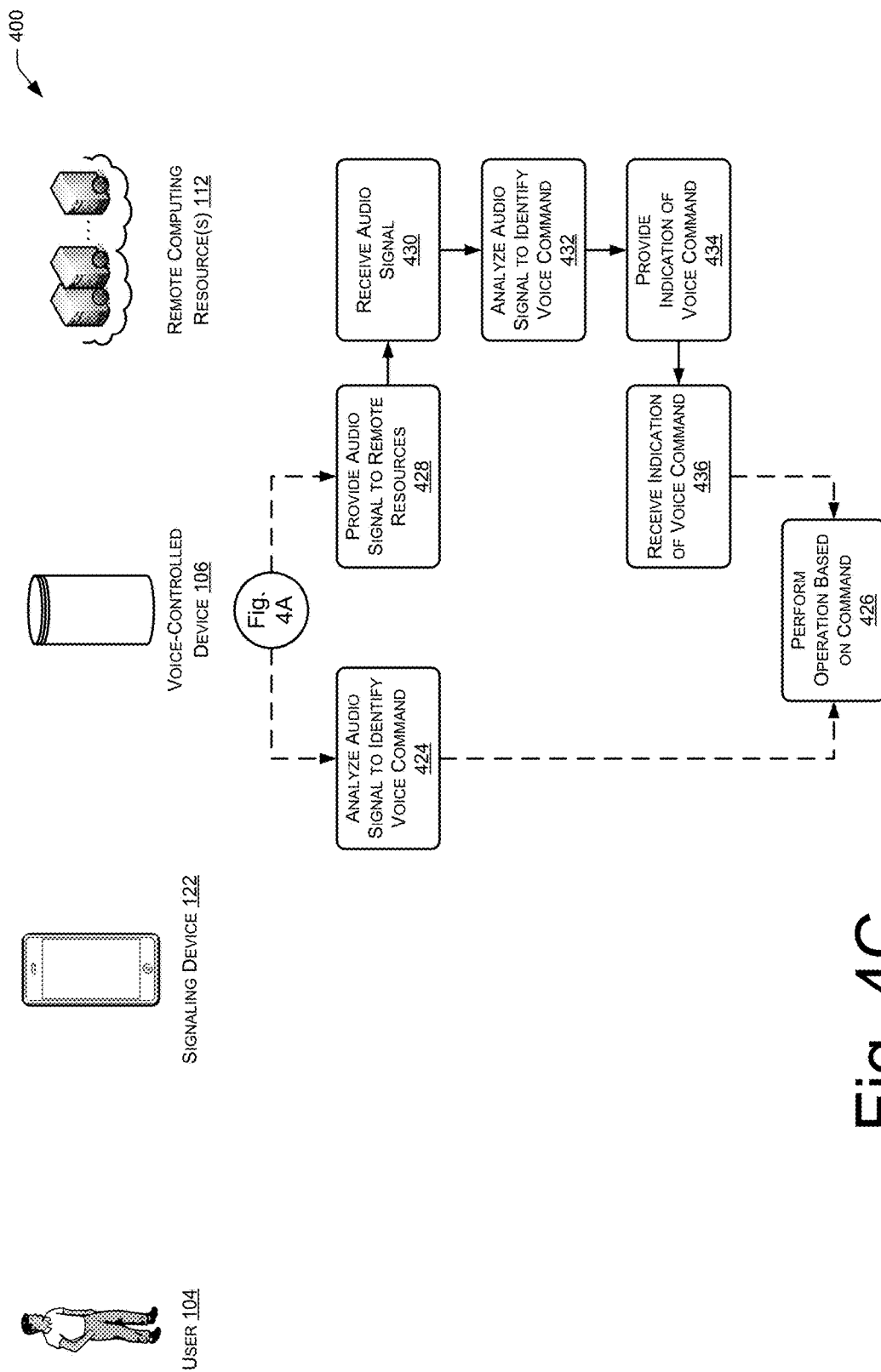

FIGS. 4A-4C depict a flow diagram of an example process 400 that includes a signaling device sending a signal to a voice-controlled device to indicate to the voice-controlled device that a user is going to provide a voice command. Actions illustrated underneath the user 104 may be performed by the user, actions illustrated under the signaling device 122 may be performed by the signaling device 122, actions illustrated under the voice-controlled device 106 may be performed by the voice-controlled device 106, and actions illustrated under the remote computing resources 112 may be performed by the remote computing resources 112. Of course, while the process 400 illustrates one example, it is to be appreciated that the actions may be performed by other entities in other examples.

The process 400 is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

At 402, the user 104 actuates a button on the signaling device 122. This may include actuating a physical button or a soft button, as described above with reference to FIGS. 3A and 3B, respectively. At 404, the signaling device 122 receives an indication of the actuation by the user. In response, at 406 the signaling device generates and sends a signal indicating this actuation to the voice-controlled device 106. The signaling device 122 may send this signal wirelessly, such as via Bluetooth, WiFi, a near-field-communication protocol, 802.11 wireless protocols, or via another wireless protocol.

At 408, the voice-controlled device 106 receives the signal indicating the user's actuation of the button. At 410, the voice-controlled device 106 may cease providing audio from the user's environment if the device 106 is maintaining a voice communication when the signal is received (i.e., may mute the phone call). Alternatively, the voice-controlled device 106 may cease or attenuate audio being output by the voice-controlled device 106, if the device 106 is in fact outputting audio when the signal is received. Regardless of whether the voice-controlled device 106 performs actions 410 and/or 412, at 414 the voice-controlled device 106 may identify the location of the signaling device 122 for the purpose of focusing on sound received proximate to the device 122.

FIG. 4B continues the illustration of the process 400 and includes, at 416, preparing to process an audio signal generated by a microphone of the device 106. That is, in response to receiving the signal from the signaling device 122, the device 106 may prepare to process audio received for the purpose of identifying a voice command from the user. At 418, the user 104 provides a voice command after actuating the button of the signaling device 122. At 420, a microphone of the voice-controlled device 106 captures sound from within the environment, with the sound including the voice command of the user. At 422, the microphone generates an audio signal based on the captured sound.

FIG. 4C continues the illustration of the process 400 and includes, at 424, the voice-controlled device 106 analyzing the audio signal to identify a voice command from within the audio signal. For instance, continuing the example from FIG. 1, the voice-controlled device 106 may identify the user 104 requesting that the device 106 call Steve Smith. At 426, the device 106 may perform an operation corresponding to the voice command. For instance, the device 106 may call the example user Steve Smith.

In some instances, rather than the analyzing the audio signal locally, the voice-controlled device 106 may provide the signal to a remote service for analyzing. At 428, for instance, the voice-controlled device 106 provides the generated audio signal to the remote computing resources 112, which receives the audio signal at 430. At 432, the remote computing resources 112 analyze the audio signal to identify the voice command. At 434, the remote computing resources 112 provide an indication of the identified voice command to the voice-controlled device 106, which receives the indication at 436. The voice-controlled device 106 may then perform the operation associated with the voice command of the user. In other instances, meanwhile, the remote resources 112 may identify an operation to provide in response to the voice command and may provide an indication of this operation, or a response for output, to the device 106.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. An apparatus comprising;
a microphone;
a wireless network interface;
a processor; and
computer-readable media storing computer-executable instructions that, when executed on the processor, cause the processor to perform acts comprising:
receiving, via the wireless network interface and from a device that is external to the apparatus, a signal indicating that a voice command is to be received at the apparatus; and generating an audio signal based on sound captured by the microphone, the audio signal representing the voice command.

2. The apparatus as recited in claim 1, further comprising a speaker to output audio, and the acts further comprising at least one of attenuating or ceasing output of the audio on the speaker at least partly in response to receiving the signal from the device that is external to the apparatus.

3. The apparatus as recited in claim 1, the acts further comprising
analyzing the audio signal to identify the voice command.

4. The apparatus as recited in claim 1, the acts further comprising
providing the audio signal to a service that is remote from the apparatus to identify the voice command.

5. The apparatus as recited in claim 4, the acts further comprising:
receiving, from the service, an indication of the voice command in the audio signal; and
performing an operation corresponding to the voice command.

6. The apparatus as recited in claim 1, the acts further comprising:
receiving a second signal via the wireless network interface and from the device that is external to the apparatus; and
muting the microphone of the apparatus at least partly in response to receiving the second signal from the device that is external to the apparatus.

7. The apparatus as recited in claim 1, wherein the device that is external to the apparatus comprises a housing having a single button, and wherein the signal is received at least partly in response to activation of the button.

8. The apparatus as recited in claim 1, wherein the device that is external to the apparatus comprises an electronic device implementing a graphical user interface (GUI) that includes a soft button, and wherein the signal is received at least partly in response to activation of the soft button.

9. The apparatus as recited in claim 1, wherein the apparatus refrains from performing an operation associated with the voice command absent receiving the signal from the device that is external to the apparatus.

10. The apparatus as recited in claim 1, the acts further comprising identifying a location of the device that is external to the apparatus at least partly in response to receiving the signal from the device that is external to the apparatus.

11. A method comprising:
under control of a first electronic device that includes a wireless network interface, a microphone, and executable instructions,
receiving, via the wireless network interface and from a second electronic device that is separate from the first electronic device, a signal indicating that a voice command is to be received at the first electronic device; and
generating an audio signal based on sound captured by the microphone, the audio signal representing the voice command.

12. The method as recited in claim 11, further comprising at least one of: (i) analyzing the audio signal generated by the microphone to identify the voice command, or (ii) providing the audio signal to a service that is remote from the apparatus to identify the voice command.

13. The method as recited in claim 11, further comprising:
receiving a second signal via the wireless network interface from the second electronic device; and
muting the microphone of the first electronic device at least partly in response to receiving the second signal from the second electronic device.

14. The method as recited in claim 13, further comprising:
receiving a third signal via the wireless network interface and from the second electronic device; and
un-muting the microphone of the first electronic device at least partly in response to receiving the third signal from the second electronic device.

15. The method as recited in claim 11, wherein the first electronic device further includes a speaker to output audio, and further comprising at least one of attenuating or ceasing output of the audio on the speaker at least partly in response in response to receiving the signal from the second electronic device.

16. One or more computer-readable media storing computer-executable instructions that, when executed on a processor of a first electronic device, cause the processor to perform acts comprising:
receiving, from a second electronic device that is separate from the first electronic device, a signal indicating that a voice command is to be received at the first electronic device; and
generating an audio signal based on sound captured by a microphone of the first electronic device, the audio signal representing the voice command.

17. The one or more-computer-readable media as recited in claim 16, the acts further comprising analyzing the audio signal generated by the microphone to identify the voice command.

18. The one or more-computer-readable media as recited in claim 16, the acts further comprising providing the audio signal to a service that is remote from the first electronic device to identify the voice command.

19. The one or more-computer-readable media as recited in claim 16, wherein the apparatus refrains from at least one of: (i) generating the audio signal, (ii) analyzing the audio signal to identify the voice command, or (iii) providing the audio signal to a service that is remote from the first electronic device to identify the voice command absent receiving the signal from the second electronic device that is separate from the first electronic device.

20. The one or more-computer-readable media as recited in claim 16, the acts further comprising at least one of attenuating or ceasing output of audio on a speaker of the first electronic device at least partly in response to the receiving of the signal.

* * * * *